United States Patent
Resetic et al.

(10) Patent No.: US 9,969,847 B2
(45) Date of Patent: May 15, 2018

(54) POLYMER DISPERSED LIQUID CRYSTAL ELASTOMERS (PDLCE)

(71) Applicant: Jozef Stefan Institute, Ljubljana (SI)

(72) Inventors: Andraz Resetic, Ljubljana (SI); Jerneja Milavec, Ljubljana (SI); Blaz Zupancic, Ljubljana (SI); Bostjan Zalar, Ljubljana (SI)

(73) Assignee: JOZEF STEFAN INSTITUTE, Ljubljana (SI)

( * ) Notice: Subject to any disclaimer, the term of this patent is extended or adjusted under 35 U.S.C. 154(b) by 0 days. days.

(21) Appl. No.: 15/126,021

(22) PCT Filed: Mar. 17, 2015

(86) PCT No.: PCT/EP2015/055527
§ 371 (c)(1),
(2) Date: Sep. 14, 2016

(87) PCT Pub. No.: WO2015/140149
PCT Pub. Date: Sep. 24, 2015

(65) Prior Publication Data
US 2017/0183456 A1 Jun. 29, 2017

(30) Foreign Application Priority Data
Mar. 17, 2014 (GB) .................................. 1404746.8

(51) Int. Cl.
| C08J 3/00 | (2006.01) |
| C09K 19/54 | (2006.01) |
| C09K 19/38 | (2006.01) |
| C08L 101/12 | (2006.01) |
| C08L 83/04 | (2006.01) |
| C08J 3/28 | (2006.01) |

(52) U.S. Cl.
CPC ................. *C08J 3/005* (2013.01); *C08J 3/28* (2013.01); *C08L 83/04* (2013.01); *C08L 101/12* (2013.01); *C09K 19/38* (2013.01); *C09K 19/544* (2013.01); *C08J 2300/26* (2013.01); *C08J 2383/04* (2013.01); *C08L 2205/12* (2013.01)

(58) Field of Classification Search
CPC . C08J 3/005; C08J 2300/26; C08J 3/28; C08J 2382/04; C08L 83/04; C08L 2205/12; C08L 101/12; C09K 19/38; C09K 19/544

USPC ............................................. 522/3, 1; 520/1
See application file for complete search history.

(56) References Cited

U.S. PATENT DOCUMENTS

| 3,872,050 A * | 3/1975 | Benton ................ C09K 19/544 349/20 |
| 5,385,690 A | 1/1995 | Finkelmann et al. |
| 6,046,791 A * | 4/2000 | Kobayashi ........... C09K 19/544 349/183 |
| 2004/0095658 A1* | 5/2004 | Buretea .................. B82Y 20/00 359/853 |

FOREIGN PATENT DOCUMENTS

| EP | 1927640 A1 | 6/2008 |
| JP | 2011023276 A | 2/2011 |
| WO | WO 89/09419 A1 | 10/1989 |
| WO | WO 2004/015491 A1 | 2/2004 |
| WO | WO 2008/110316 A1 | 9/2008 |
| WO | WO 2010/112831 A1 | 10/2010 |
| WO | WO 2011/036080 A1 | 3/2011 |

OTHER PUBLICATIONS

Buguin et al. (2006) "Micro-Actuators: When Artificial Muscles Made of Nematic Liquid Crystal Elastomers Meet Soft Lithography" JACS 128, 1088-1089.
International Search Report and Written Opinion dated Jun. 10, 2015 in PCT/EP2016/055527.
Kupfer et al. (1991) "Nematic Liquid Single-Crystal Elastomers" Makromol. Chem.—Rapid Commun. 12, 717-726.
Ohm et al. (2010) "Liquid Crystalline Elastomers as Actuators and Sensors" Adv. Mater. 22, 3366-3387.

* cited by examiner

*Primary Examiner* — Jessica Whiteley
(74) *Attorney, Agent, or Firm* — Swanson & Bratschun, L.L.C.

(57) ABSTRACT

The present invention relates to a method of producing liquid crystal elastomer (LCE) based components. The method comprises the steps of (i) providing or creating micro-sized or nano-sized LCE particles, (ii) dispersing the particles in an uncured liquid polymer, (iii) aligning the nematic directors of the particles and, (iv) shaping and curing the matrix/particles mixture. The composite material formed by this method is a polymer dispersed liquid crystal elastomer (PDLCE) with custom-tailored properties which can be shaped into arbitrary forms.

11 Claims, 4 Drawing Sheets

POLYMER DISPERSED LIQUID CRYSTAL ELASTOMERS (PDLCE)

RELATED APPLICATIONS

This application is a 35 U.S.C. § 371 national phase application of International Application Serial No. PCT/EP2015/055527 (WO 2015/140149), filed on Mar. 17, 2015, entitled "Polymer Dispersed Liquid Crystal Elastomers (PDLCE)". International Application Serial No. PCT/EP2015/055527 claims priority to Great Britain Serial No. 1404746.8, filed Mar. 17, 2014, both of which are incorporated herein by reference in their entirety.

FIELD OF THE INVENTION AND PRIOR ART

This invention relates to a method of producing liquid crystal elastomer (LCE) based components. The invention is in the area of smart materials and in particularly relates to polymers with custom-tailored properties.

The widespread use of polymers, in particular elastomers, in modern technologies strongly relies on the fact that they are relatively undemanding for molding, reshaping, and machining. In most applications, polymer or elastomer parts are used as passive mechanical components or as replacements for strings, respectively. Only recently, smart soft materials with external stimuli-induced mechanical responsiveness have been developed. Among them, electroactive polymers have been employed most extensively in the development of a new generation of actuator and transducer elements, both for macroscopic devices, e.g. artificial muscles, and micro- and nano-sized devices, e.g. MEMS and NEMS. Nevertheless, liquid crystal elastomers (LCEs) are becoming an increasingly strong competitor in this area.

LCEs are smart polymer materials that combine the ordering of mesomorphic molecules with the elastic properties of polymer networks. Polymer liquid crystal phases are formed when orientational/positional ordering typical for liquid crystals occurs in polymers. For example, by concatenating mesogenic units to form polymer liquid crystals, the nematic or smectic interaction between mesogens imposes anisotropy upon the polymer backbone. Liquid crystal elastomers are in principle liquid crystal polymers that have polymer network cross-linked at several points by means of crosslinks. This stabilizes the network by reducing its ability to flow, and gives rise to entropic rubber elasticity, which is not encountered in liquid crystals. Due to the coupling between mesomorphic ordering and polymer network, the macroscopic dimensions of monodomain liquid crystal elastomers can be altered reversibly with temperature change. Equivalently, LCEs exhibit thermomechanical response. For example, an increase of the nematic ordering (cooling) will make the elastomer longer, whereas the decrease of order (heating) will contract the material.

Thermally and EM radiation-controlled shape memory behavior of liquid crystal elastomers (LCEs) has been exploited in many prototype devices. However, currently available LCE materials and methods for their synthesis still lack easy implementation into larger scale production environment. The major obstacle is the microscopic size of LCE domains: although individual LCE domains possess shape memory, the sample as a whole is inert since conventional UV/photo or thermal curing polymerization methods yield isotropic distribution of domain orientations. A crucial step of imprinting shape memory into a macroscopically-sized LCE specimen is therefore to instill permanent orientational alignment of domains, i.e., an effectively "monodomain" state with anisotropic physical properties on the macroscopic scale. Considering this requirement, the conventional approach to preparation of side-chain LCE networks as shown for example in U.S. Pat. No. 5,385,690A or in WO8909419A1 is severely limited by a rather restricted set of possible alignment techniques. Currently the only efficient way is to thermally polymerize a mechanically stressed, partially-crosslinked network. Such a technique is described in J. Kupfer, H. Finkelmann, "Nematic Liquid Single-Crystal Elastomers", Makromol. Chem.—Rapid Commun. 12, 717 (1991). Unfortunately, this procedure allows neither for preparation of samples of arbitrary shapes, nor for miniaturization of the geometry.

On the contrary, in thin film and restricted geometries where dimensions of the system are reduced towards the domain size scale, anisotropy is inherent, making cross-linking in the presence of electric or magnetic field, viscous flow, or at aligning surfaces very efficient in the manipulation of domain orientation. Building on the idea of precipitation polymerization of colloidal liquid crystal (LC) particles, micro-sized-LCE beads have been disclosed e.g. in WO2010112831A1. Soft-mold photolithography in the magnetic field has recently been used to create LCE micro-pillars (see A. Buguin, Min-Hui Li, P. Silberzan, B. Ladoux, and P. Keller, »Micro-Actuators: When Artificial Muscles Made of Nematic Liquid Crystal Elastomers Meet Soft Lithography«, JACS 128, 1088 (2006)). Similarly sized rod-like and elliptically shaped LCEs can also be obtained by microfluidic techniques as reported in C. Ohm, M. Brehmer, and R. Zentel, »Liquid Crystalline Elastomers as Actuators and Sensors«, Adv. Mater. 22, 3366 (2010). Moreover, these particles were demonstrated to exhibit strong thermomechanical effect, either through direct thermal control or through heating via metallic inclusions.

Another way of producing LCE components is to create composites comprising conventional isotropic elastomer and mesomorphic elastomer inclusion or a set of inclusions, the shape of which is controlled externally by optical, electrical, mechanical, thermal, or chemical means (WO2011036080A1). Although new properties can be obtained in this way, the described method uses similar chemical synthesis and alignment procedures that are a limiting factor also with standard LCEs. In such a composite, the volume of the activating inclusion is of the same order of magnitude as the volume of the surrounding passive polymer material, i.e. the material is not a composite on the microscopic scale. Therefore, stress and strain fields of the activated structure strongly depend on the shape and orientation of the inclusion. In the components of the present invention, this is not the case since LCE particles's size is typically much smaller than the size of the composite specimen. Consequently, inhomogeneous local stresses and strains average out to their mean values, the composite's effective elastic and thermomechanical properties resemble those of a conventional bulk LCE material.

In the current state of the art the thermo-mechanical properties of LCEs are controlled chemically. This is achieved by synthesizing various thermotropic mesogens that exhibit different degrees of orientational and positional ordering. When inserted in the elastomeric structure, these mesogenic units retain their ordering ability, which determines the final structural and mechanical properties of the material. Other approaches mostly rely on varying the relative concentrations of mesogens and cross-linkers in the pre-polymerization mixture, incorporation of non-mesomorphic co-monomers, or polymer reprocessing with low molar mass mesogens. However, the so far proposed and used methods of controlling LCE material properties do not allow for significant deviation from the standard non-linear thermomechanic response, i.e., slow changes at low or high temperatures and quick response in the phase transition region. The incorporation of non-mesomorphic co-monomers, for example, results in a decrease of the nematic-paranematic transition temperature but does not alter the shape of thermo-mechanic response curve. Moreover, minor details of the polymer melt chemistry and the parameters used during alignment phase all heavily influence the response of the resulting elastomeric network. This leads to serious problems with the reproducibility of sample preparation. Furthermore, functionalization of chemically prepared LC elastomers is very limited since the addition of various functional materials to the prepolymerization mixture disrupts the liquid crystalline order and interferes with the polymerization process.

SUMMARY OF THE INVENTION

The object of this invention is to provide a reliable method for manufacturing LCE based components with custom-tailored properties. More specifically, thermo-mechanical behavior that is significantly different from the standard mechanical deformation vs. temperature curve has to be obtainable. In some cases it is desirable for the material to have linear response in a wide temperature range while still preserving large maximum strain. In other cases, a band response is more suitable where the component contracts and elongates only in a specific temperature interval, but has a rather constant length outside this interval. More complicated strain curves should be possible such as multi-step response where sharp changes in elongation at certain temperatures are interleaved with temperature ranges where there is almost no strain change. These kinds of materials could be used as switches, temperature controlled valves or micro-pumps imitating peristaltic motion. In addition to the tailored thermo-mechanical curve, the maximum strain and Young's modulus of LCE components should be easily controllable. Furthermore, functionalization of LCE composites should be possible by using different filler materials.

The object is achieved with the method according to claim 1. Advantageous embodiments of the method are subject matter of the dependent claims or are disclosed in the subsequent portions of the description and preferred embodiments.

The proposed method comprises the steps of (i) providing or creating micro-sized or nano-sized LCE particles (henceforth designated as the "particles"), (ii) dispersing the particles in an uncured liquid polymer, preferably an elastomer, (henceforth designated as the "matrix"), (iii) aligning/orienting the nematic directors of the particles and, (iv) shaping and curing the matrix/particles mixture. The composite material formed by this method is a polymer dispersed liquid crystal elastomer (PDLCE) (in the following also denoted as the "composite"). This material is effectively a binary soft-soft composite and exhibits elastic behavior intermediate between the rubber elasticity of the cured matrix and soft/semi soft elasticity of the particles. The composite can be shaped into arbitrary forms and functionalized using pre-functionalized matrix, e.g. matrix containing micro- or nano-sized fillers.

The invention method is based on the idea that regarded as fillers or inclusions in a soft polymer matrix, LCE particles should render the composite material effectively thermomechanically active, provided that their axes of anisotropy are at least partially aligned. The method is thus based on the manipulation of micro- and submicro-sized LCE domains, embedded into a soft polymer matrix. Such soft-soft composites resemble the structure of polymer-dispersed liquid crystals (PDLCs), where instead of liquid crystal polymerized LCEs are used (PDLCE). The final thermo-mechanical response of PDLCEs is a superposition of responses of all constituent elastomer species. The main advantage of these composites in comparison with conventional liquid crystal elastomers is a non-chemical approach to manufacturing. Specifically, either preexisting bulk LCE materials, powdered mechanically, or directly synthesized LCE micro- or nanoparticles are mixed with polymer/elastomer resin to provide for easy manipulation of particle size, composition, and degree of alignment, resulting in an efficient tailoring of the thermal response.

Micro- and submicro-sized LCE particles may be fabricated by freeze-fracturing or low temperature milling of bulk LCE pieces. Bulk LCEs used can be of mono- or poly-domain type. In the case of monodomain elastomers, the resulting particles can have various size distributions in 100 nm to 100 µm range. In the case of poly-domain elastomers, the maximum usable size of the particles is limited by the size of domains. In either case, the resulting LCE particles are anisotropic, i.e. they have a preferential orientation direction regardless of their single- or multi-domain character. Alternatively to the above mechanical process, LCE particles can be directly produced by one of the previously known methods to assure more uniform morphology. Possible methods include template-assisted synthesis, soft lithography or direct polymerization of LC droplets in a suspension.

Pre-polymerization mixture is prepared by dispersing said micro- or nano-sized LCE particles inside uncured matrix material. The matrix material is an LCE compatible, thermally or UV curable, polymer with suitable viscosity to allow for efficient mixing and slow-enough particle segregation (on the timescale of the curing process). The imbedded particles can be of only one LCE type. In this case, the properties of the final composite or component can be tailored by varying the concentration, particle size and the type of matrix material. In another embodiment, the particles could be a mix made of different LCE materials. In such a composite or component, the final properties are determined by the relative concentrations among constituting species and the resulting distributions of particle phase transition temperatures, maximum strains and elastic moduli.

Before curing, the micro- or nano-sized LCE particles are aligned in the pre-polymerization mixture, e.g. by a magnetic field. This method for aligning exploits the magnetic anisotropy of nematic domains. Depending on the sign of the diamagnetic anisotropy, the particles are oriented either parallel or perpendicular to the magnetic field. The average orientational order is controlled by varying the magnetic field strength, whereas the average direction depends on the direction of the field. In one embodiment, spatially modulated magnetic field is used to create a composite with spatially modulated thermo-mechanical response. In another embodiment, a sequential curing of layers with differently aligned particles is performed. As an alternative, electric fields can be used to control the orientational ordering of the particles.

Functionalized matrix materials can also be used for forming the composite or component, typically filled with conductive, ferroelectric or ferromagnetic nanoparticles or photoactive molecules. Polymerization inhibition issues, often encountered when attempting to functionalize the LCE component, are thus avoided, and nothing beyond thermomechanical responsiveness needs to be provided by LCE particles. In one embodiment, conductive particles are dispersed into the matrix to make the composite suitable for actuation via resistive heating.

BRIEF DESCRIPTION OF THE DRAWINGS

In the following section several proposed composite types are described by way of examples in connection with the accompanying figures. The figures show.

DESCRIPTION OF EMBODIMENTS

Figure 1A:
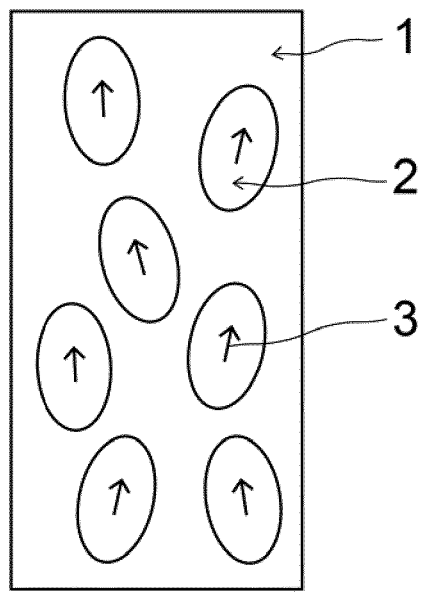
FIG. 1A: Basic composite with mono-domain LCE particles.

FIG. 1A shows a schematic representation of a basic PDLCE composite structure that is also common for all other composite types. The composite comprises the polymer matrix 1 and single-domain LCE particles 2. Before polymerization, LCE particles are aligned by external field so that individual nematic directors 3 point approximately in the same direction. The degree of orientation depends on various parameters like external field strength, viscosity of polymer matrix, and particle size. Both the polymer matrix and LCE particles are selected to be chemically compatible and are glued together during the polymerization process. The particle orientation is thus locked, allowing for actuation of the composite.

Figure 1B:
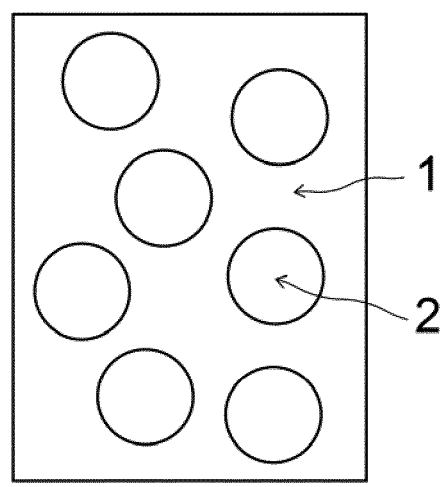
FIG. 1B: Basic composite with mono-domain LCE particles in the actuated state.

FIG. 1B shows the composite, depicted in FIG. 1A, in the actuated state, i.e. at temperatures above the nematic-to-isotropic phase transition. During the phase transition, the LCE particles 2 contract in direction parallel and expand in direction perpendicular to the nematic director. As a consequence, the polymer matrix 1 is deformed accordingly, producing a macroscopically observed shape change in the composite sample.

Figure 2:
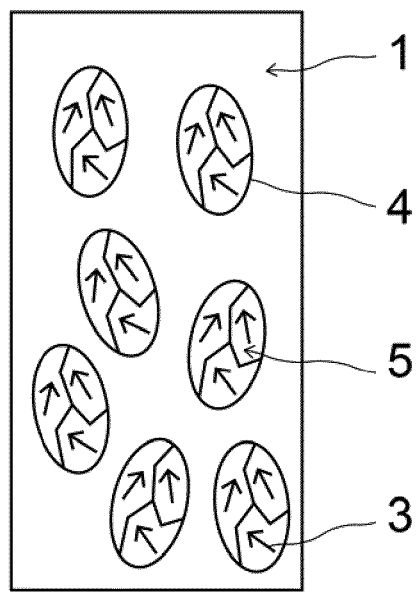
FIG. 2: Composite where LCE particles have multiple partially ordered domains.

FIG. 2 schematically depicts variation No. 2 of PDLCE composite where multi-domain LCE particles 4 are included in the polymer matrix 1. The multi-domain particles can be produced by milling the poly-domain LCE material, thus avoiding the tedious two-step crosslinking approach for production of single-domain LCEs. Below a certain particle size, multidomain particles become electrically or magnetically active, since, due to small number of domains 5, there is a remnant anisotropy. Such particles can thus be aligned in an external field in the same way as single-domain particles.

Figure 3:
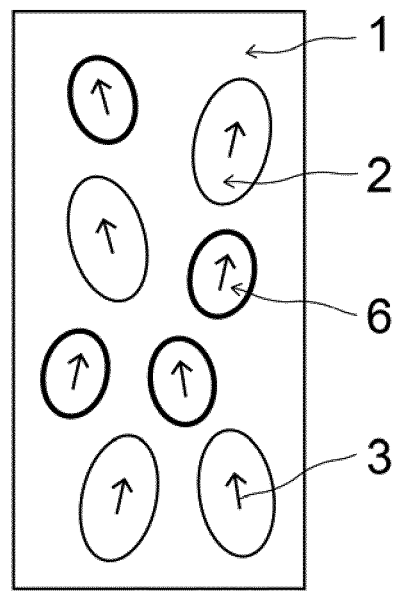
FIG. 3: Composite where thermo-mechanical properties are customized by using two different LCE types.

FIG. 3 shows variation No. 3 of PDLCE composite comprising the polymer matrix 1, the first type of LCE particles 2, and the second type of LCE particles 6. The two kinds of particles can have different sizes, order parameters, phase transition temperatures, and anisotropic properties. The final properties of the composite are defined by individual properties of both types of particles, thus allowing for custom tailoring of thermo-mechanical response. The particles can exhibit diamagnetic anisotropy of equal or opposite signs. In the first case, the nematic directors 3 of both types of particles are aligned in parallel, whereas in the second case they are mutually perpendicular.

Figure 4:
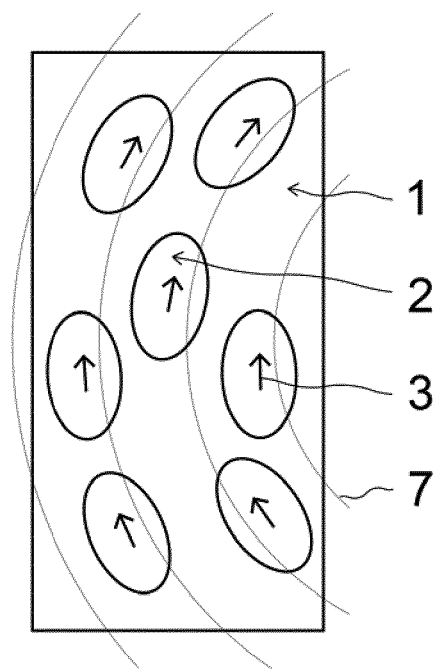
FIG. 4: Composite with spatially modulated alignment of LCE particles.

FIG. 4 shows variation No. 4 of basic composite where there is spatial distribution of particle 2 orientations. This kind of composite is produced by using a spatially modulated external field 7 during alignment phase. External magnetic field can be used to produce such composite. In the case of positive magnetic anisotropy, the directors 3 of the particles are aligned in parallel with the field. This results in a spatially modulated thermo-mechanical response.

Figure 5:
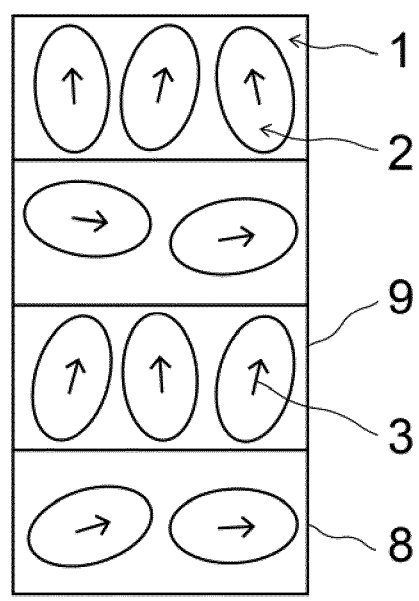
FIG. 5: Morphing composite prepared by sequential alignment and polymerization.

FIG. 5 shows morphing composite which is variation No. 5 of basic composite type. The composite is built sequentially by adding separate polymer layers. First a single layer 8 of the pre-polymerization mixture is deposited, oriented and partially polymerized. Next, a second layer 9 with orientation perpendicular to the first layer is created with the same procedure. Since both layers are only partially polymerized a strong bond is created between them. At the same time the mobility of LCE particles is reduced so that the orientation of particles is locked. An arbitrary number of additional layers can be deposited creating an interleaved structure. Finally, the composite is fully polymerized.

Figure 6:
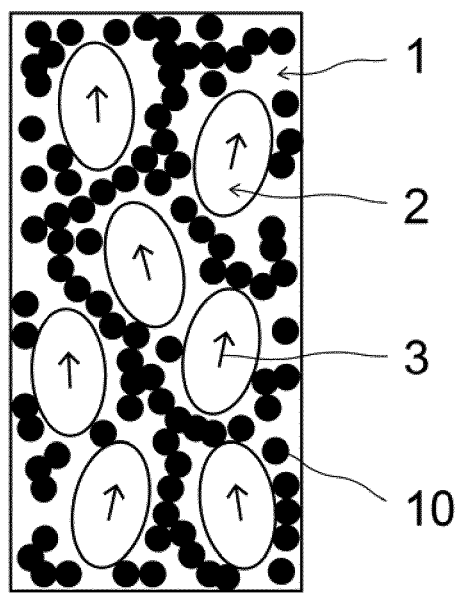
FIG. 6: Functionalized conductive composite.

FIG. 6 shows functionalized PDLCE composite (variation No. 6). Compared to basic composite, conducting particles 10 are added to the polymer matrix 1. The concentration of conducting particles is above the percolation threshold making the sample conductive. This kind of composite can be resistively heated and is suitable for indirect electrical actuation.

An example for the preparation of the basic PDLCE composite is given in the following. A standard monodomain liquid crystal elastomer is first cut into small pieces (1×1 mm) to prepare for milling. Before milling, LCE pieces are mixed with polydimethylsiloxane base elastomer Sylgard® 184 (Dow Corning) in 3:1 weight ratio, respectively. The LCE-PDMS mixture is put in a mortar and cooled with liquid nitrogen until visibly frozen. A pestle is then used to crush the LCE-PDMS mixture into smaller sized pieces. This process is repeated until the mixture is homogeneous and in paste form. Finally, the mixture is left at room temperature to dry off water condensation.

In the next step, the LCE-PDMS mixture is further mixed with base PDMS, such that the weight ratio between LCE and PDMS reaches 1:1. Sylgard® 184 curing agent (Dow Corning) is then added and mixed in 1:30 curing agent to base PDMS weight ratio. The mixture is put into vacuum to remove any entrapped air. Using a spatula, the mixture is introduced into a glass tube (45 mm in length and 5 mm in diameter) with inserted Teflon foil that prevents PDMS adhesion to the glass surface. The tube is then sealed on both sides with Teflon tape.

The sample is inserted into a magnetic field (8.9 T) with long axis oriented parallel to the field and is left for two hours at 300K. During this time, the LCE particles in the mixture are oriented so that the average nematic director of the particle is pointing in the direction of the magnetic field. After two hours, the sample is left to cure in the magnet for approximately 12 h at 320K (at least 20K under the N-I transition temperature of the LCE). The resulting LCE-based component has a cylindrical shape determined by the glass tube.

Figure 7:
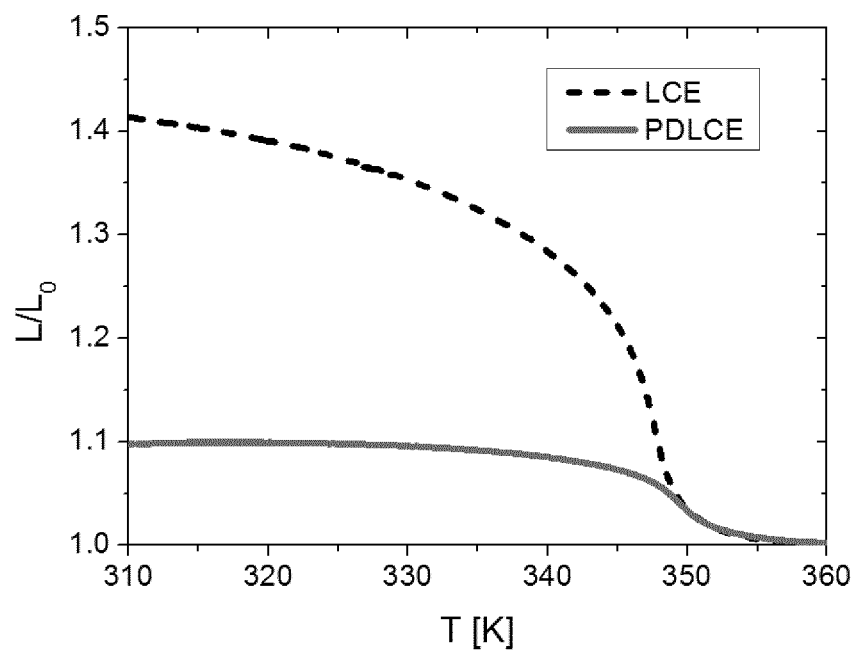
FIG. 7: Comparison of LCE and PDLCE thermomechanical response.

A thermomechanic response curve typical for PDLCE composite prepared according to the above description is shown in FIG. 7.

FIG. 7 shows a comparison of relative mechanical deformation $L/L_0$ of the sample vs. temperature, equivalently thermomechanical response, for conventional LCEs and PDLCEs. The anomaly is weaker in PDLCEs ($L/L_0 \approx 1.1$ at low T) than in bulk LCEs ($L/L_0 > 1.4$) due to the presence of thermomechanically inert elastomer matrix in PDLCEs (PDMS in the specific case of FIG. 7). Nevertheless, the anomaly remains clearly visible and is only present in PDLCEs with oriented LCE particles (see the above discussion).

While the invention has been illustrated and described in detail in the drawings and forgoing description, such illustration and description are to be considered illustrative or exemplary and not restrictive. The invention is not limited to the disclosed embodiments. Other variations to the disclosed embodiments can be understood and effected by those skilled in the art in practicing the claimed invention, from a study of the drawings, the disclosure, and the appended claims. In the claims the word "comprising" does not exclude other elements or steps, and the indefinite article "a" or "an" does not exclude a plurality.

The invention claimed is:

1. A method of producing a thermomechanically responsive liquid crystal elastomer based component of arbitrary shape, comprising the following steps:
   a. providing micro-sized or nano-sized thermomechanically anisotropic liquid crystal elastomer particles,
   b. dispersing said liquid crystal elastomer particles in a pre-polymerization mixture of a polymer,
   c. aligning the nematic directors of said liquid crystal elastomer particles in said mixture, and
   d. shaping and curing said mixture while keeping aligned said nematic directors of said liquid crystal elastomer particles.

2. The method according to claim 1, wherein said liquid crystal elastomer particles have a single domain or consist of a plurality of partially ordered domains.

3. The method according to claim 1, wherein said step of providing micro-sized or nano-sized anisotropic liquid crystal elastomer particles includes the step of splitting macroscopic main-chain or side-chain liquid crystal elastomers by a mechanical process, in particular by milling or grinding.

4. The method according to claim 1, wherein the size of said liquid crystal elastomer particles is in the range of between 100 nm and 100 µm.

5. The method according to claim 1, wherein different types of said liquid crystal elastomer particles are provided and dispersed in said pre-polymerization mixture.

6. The method according to claim 1, wherein said liquid crystal elastomer particles are aligned by means of at least one of a magnetic field, an electric field, and a mechanical stress field.

7. The method according to claim 6, wherein the degree of alignment of said liquid crystal elastomer particles is controlled by varying the strength of the aligning field.

8. The method according to claim 6, wherein the alignment direction of said liquid crystal elastomer particles is controlled by spatial modulation of the aligning field.

9. The method according to claim 1, wherein said mixture is heat or UV cured.

10. The method according to claim 9, wherein a spatial modulation of particle ordering or alignment of said liquid crystal elastomer particles in said mixture is achieved by performing sequential alignment steps of said liquid crystal elastomer particles and locally selective UV curing of different parts of the pre-polymerization mixture after each alignment step.

11. The method according to claim 1, wherein said components are functionalized by incorporating conductive, ferroelectric, ferromagnetic or photoactive materials into pre-polymerization mixture.

* * * * *